US011222471B2

United States Patent
Jo

(10) Patent No.: US 11,222,471 B2
(45) Date of Patent: Jan. 11, 2022

(54) IMPLEMENTING THREE-DIMENSIONAL AUGMENTED REALITY IN SMART GLASSES BASED ON TWO-DIMENSIONAL DATA

(71) Applicant: Geun Sik Jo, Incheon (KR)

(72) Inventor: Geun Sik Jo, Incheon (KR)

(73) Assignee: INHA UNIVERSITY RESEARCH AND BUSINESS FOUNDATION, Incheon (KR)

( * ) Notice: Subject to any disclaimer, the term of this patent is extended or adjusted under 35 U.S.C. 154(b) by 0 days.

(21) Appl. No.: 16/386,450

(22) Filed: Apr. 17, 2019

(65) Prior Publication Data
US 2020/0184726 A1 Jun. 11, 2020

(30) Foreign Application Priority Data
Dec. 5, 2018 (KR) .......................... 10-2018-0155120

(51) Int. Cl.
*G06T 19/00* (2011.01)
*G02B 27/01* (2006.01)
*G06F 17/16* (2006.01)
*G06T 15/20* (2011.01)

(52) U.S. Cl.
CPC ........ *G06T 19/006* (2013.01); *G02B 27/0172* (2013.01); *G06F 17/16* (2013.01); *G06T 15/205* (2013.01); *G02B 2027/0138* (2013.01); *G02B 2027/0174* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 2011/0299741 A1* | 12/2011 | Zhang ................ | G06K 9/00228 382/117 |
| 2013/0069985 A1* | 3/2013 | Wong .................. | G02B 27/017 345/633 |
| 2014/0184496 A1* | 7/2014 | Gribetz ............... | G06F 3/04842 345/156 |
| 2017/0256097 A1* | 9/2017 | Finn ....................... | G06F 30/20 |
| 2018/0203112 A1* | 7/2018 | Mannion ................ | H04S 7/304 |

OTHER PUBLICATIONS

"BMW's Augmented Reality Glasses Turns Man Into Master Mechanic, Mark Wilson Sep. 4, 2009" video found at "http://www.gizmodo.com.au/2009/09/bmws-augmented-reality-glasses-turns-man-into-master-mechanic/". (Year: 2009).*

* cited by examiner

*Primary Examiner* — Yi Wang
(74) *Attorney, Agent, or Firm* — Madeline F. Schiesser; Keohane & D'Alessandro, PLLC

(57) ABSTRACT

Approaches presented herein enable implementation of augmented reality in a smart glasses device. More specifically, two-dimensional (2-D) image data of a real-world object is collected from a 2-D camera of the smart glasses device. From the collected 2-D image data, 2-D coordinate data is generated. Based on location and rotation data of the smart glasses device and 2-D depth information from a viewing angle of the smart glasses device, three-dimensional (3-D) coordinates are generated from the generated 2-D coordinate data. An augmented object is displayed, on a holographic display of the smart glasses device, at an apparent location of the real-world object utilizing the 3-D coordinates.

20 Claims, 10 Drawing Sheets

IMPLEMENTING THREE-DIMENSIONAL AUGMENTED REALITY IN SMART GLASSES BASED ON TWO-DIMENSIONAL DATA

CROSS-REFERENCE TO RELATED APPLICATION

The present patent document claims priority to Korean Patent Application No. 10-2018-01555120, filed on Dec. 5, 2018, in the Korean Intellectual Property Office, the disclosure of which is incorporated herein by reference.

TECHNICAL FIELD

The present invention relates generally to implementing three-dimensional (3-D) augmented reality and, more specifically, to extrapolating 3-D coordinates of a 3-D space from two-dimensional (2-D) imagery.

BACKGROUND

Due to the recent technological advances in information and communications, Augmented Reality (AR), by which virtual reality data is displayed on real-world objects in real time, is being used with increasing frequently in many technological areas. For instance, Korean patent application no. 10-2011-0004974 offers a typical example of a relevant technology based on augmented reality, including a location-based service.

Conventionally, recognition and tracking technology for augmented reality applications is broken into two main areas: (a) two-dimensional (2-D) recognition technology, which employs image sensors, such as cameras, and (b) three-dimensional (3-D) recognition technology, which employs space sensors. Currently, technology applying image sensors is prevalently used. Yet, in such cases, only 2-D coordinates (x, y) are used to determine a location for a given augmented object.

It is desirable for holographic devices, such as smart glasses (e.g., Google Glass), to be able to express spatial coordinates in order to provide immersion to the user. However, currently, such holographic devices are limited by 2-D recognition technology that only employs 2-D coordinates, neglecting a z-space coordinate. Furthermore, current technologies that collect and employ data for viewing in industrial sites are based on 2-D technology. As such, it is impossible to accurately apply 2-D data to holographic devices in a real-world 3-D environment, resulting in a jarring mismatch between an augmented reality object that a user sees through the device and the actual real-world environment. As such, cases of accurately applying holographic devices at industrial sites are essentially non-existent due to underlying issues facing 3-D data-based recognition.

SUMMARY

Approaches presented herein enable implementation of augmented reality in a smart glasses device. More specifically, two-dimensional (2-D) image data of a real-world object is collected from a 2-D camera of the smart glasses device. From the collected 2-D image data, 2-D coordinate data is generated. Based on location and rotation data of the smart glasses device and 2-D depth information from a viewing angle of the smart glasses device, three-dimensional (3-D) coordinates are generated from the generated 2-D coordinate data. An augmented object is displayed, on a holographic display of the smart glasses device, at an apparent location of the real-world object utilizing the 3-D coordinates.

One aspect of the present invention includes a method for implementing augmented reality in a smart glasses device, the method comprising: collecting two-dimensional (2-D) image data of a real-world object from a 2-D camera of the smart glasses device; generating 2-D coordinate data from the collected 2-D image data; generating, based on location and rotation data of the smart glasses device and 2-D depth information from a viewing angle of the smart glasses device, three-dimensional (3-D) coordinates from the generated 2-D coordinate data; and displaying, on a holographic display of the smart glasses device, an augmented object at an apparent location of the real-world object utilizing the 3-D coordinates.

Another aspect of the present invention includes a computer system for implementing augmented reality in a smart glasses device, the computer system comprising: the smart glasses device; a memory medium comprising program instructions; a bus coupled to the memory medium; and a processor for executing the program instructions, coupled to the bus, that when executing the program instructions causes the system to: collect two-dimensional (2-D) image data of a real-world object from a 2-D camera of the smart glasses device; generate 2-D coordinate data from the collected 2-D image data; generate, based on location and rotation data of the smart glasses device and 2-D depth information from a viewing angle of the smart glasses device, three-dimensional (3-D) coordinates from the generated 2-D coordinate data; and display, on a holographic display of the smart glasses device, an augmented object at an apparent location of the real-world object utilizing the 3-D coordinates.

Yet another aspect of the present invention includes a computer program product for implementing augmented reality in a smart glasses device, the computer program product comprising a computer readable hardware storage device, and program instructions stored on the computer readable hardware storage device, to: collect two-dimensional (2-D) image data of a real-world object from a 2-D camera of the smart glasses device; generate 2-D coordinate data from the collected 2-D image data; generate, based on location and rotation data of the smart glasses device and 2-D depth information from a viewing angle of the smart glasses device, three-dimensional (3-D) coordinates from the generated 2-D coordinate data; and display, on a holographic display of the smart glasses device, an augmented object at an apparent location of the real-world object utilizing the 3-D coordinates.

BRIEF DESCRIPTION OF THE DRAWINGS

These and other features of this invention will be more readily understood from the following detailed description of the various aspects of the invention taken in conjunction with the accompanying drawings in which.

Figure 1:
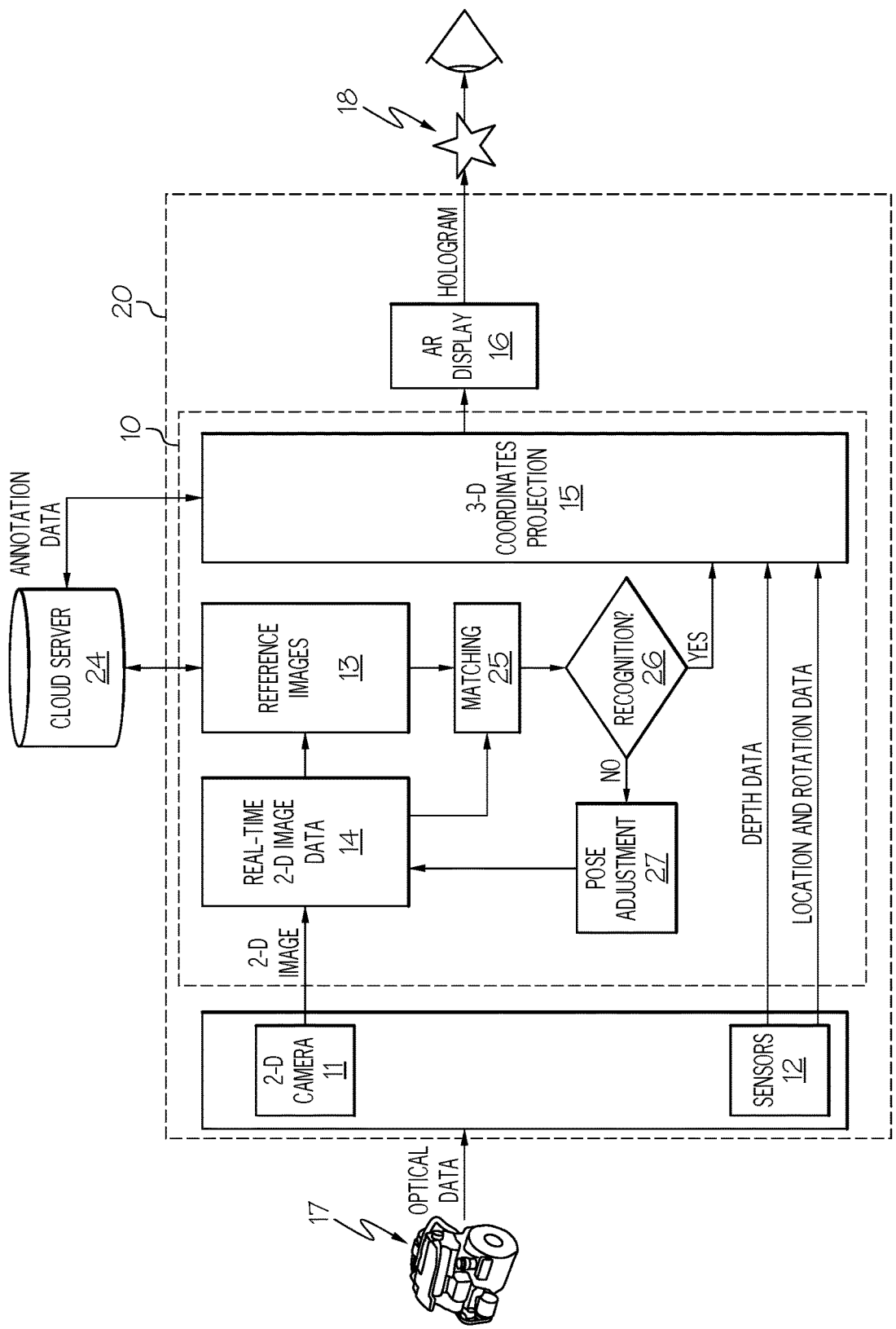
FIG. 1 shows a block diagram showing an internal configuration and process of a system to implement augmented reality according to illustrative embodiments of the present invention.
Figure 2:
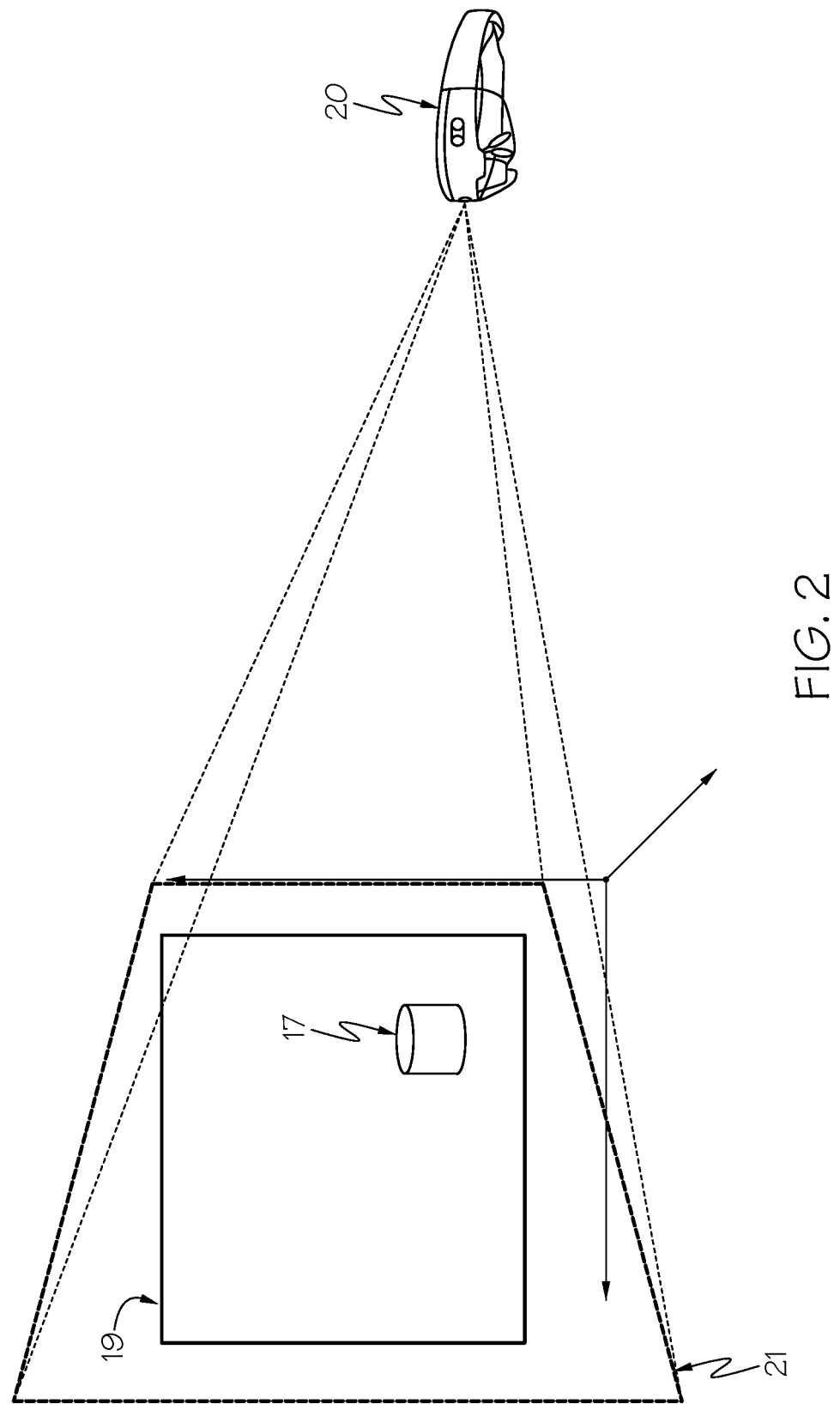
FIG. 2 shows an example of two-dimensional (2-D) image data, according to illustrative embodiments of the present invention.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for a method and system for estimating coordinates in real 3-D space for an augmented object through recognition of that space based on a 2-D image of the same. Through techniques that will be discussed herein, embodiments of the present invention enable 3-D coordinates-based augmented reality.

According to some embodiments of the present invention, implementing 3-D augmented reality in smart glasses can involve several phases or steps. It should be understood that each step or phase may represent a module, segment, or portion of instructions, which comprises one or more executable instructions for implementing specified logical function(s). In some alternative implementations, the functions noted in the steps occur out of the order discussed here and below. For example, two phases described in succession may, in fact, be executed substantially concurrently, or the phases may sometimes be executed in the reverse order, depending upon the functionality involved. It will also be noted that each phase can be implemented by special purpose hardware-based systems that perform the specified functions or acts or carry out combinations of special purpose hardware and computer instructions. In any case, according to some embodiments, these phases or steps are as follows: collecting 2-D image data from a 2-D based camera component of a smart glasses device; generating 2-D coordinate data from the collected 2-D image data; generating, based on a location and rotation data of the smart glasses device as well as 2-D depth information from a viewing angle of the smart glasses device, 3-D coordinates from the generated 2-D coordinate data; and, finally, displaying, on a holographic display of the smart glasses device, an augmented object utilizing the 3-D coordinates.

According to some embodiments, the 2-D coordinate data generation from the collected 2-D image data, a 2-D image homography matrix estimation algorithm can be used to generate such 2-D coordinate data.

According to some further embodiments, the 3-D coordinates projection can include the following sub-steps or phases: calculating a projection matrix corresponding to an angle and distance of the smart glasses device to real elements of the real-world space; standardizing the generated 2-D coordinate data as spatial coordinates of the camera; creating, on the standardized spatial coordinates, a virtual plane that is perpendicular to a line of sight of the smart glasses device; generating 3-D coordinates on the virtual plane using the calculated projection matrix; and determining 3-D coordinates at which to display an augmented object based on the generated 3-D coordinates.

According to some further embodiments, the 3-D coordinates projection can further include using the virtual plane to back-project from 2-D to 3-D, wherein a geometric location of the virtual plane is determined based on the projection matrix and the standardized spatial coordinates.

According to some further embodiments, the 3-D coordinates projection can further include generating a straight line that connects location coordinates of the smart glasses device to the 3-D coordinates; extending the straight line to extract a point at which the straight line intersects with a 2-D depth image of the 2-D depth information; and determining the extracted point as 3-D coordinates at which to display the augmented object.

According to some embodiments of the present invention, a computer system can implement 3-D augmented reality in smart glasses. This computer system can contain at least one processor which is capable to execute memory-based, computer-readable commands. The processor can carry out these memory-based, computer-readable commands to collect 2-D image data from a 2-D based camera component of a smart glasses device; generate 2-D coordinate data from the collected 2-D image data; generate, based on a location and rotation data of the smart glasses device as well as 2-D depth image from a viewing angle of the smart glasses device, 3-D coordinates from the generated 2-D coordinate data; and, finally, display, on a holographic display of the smart glasses device, an augmented object utilizing the 3-D coordinates.

The inventor of the present invention has discovered that, in cases where 3-D model data of a real-world object or environment of interest is unavailable, the object or environments location on a plane can be recognized based on 2-D imagery and, thus, 3-D coordinates for an augmented object that is to appear in the same space as the real-world object or environment can be estimated. For example, in one particular application of embodiments of the present invention, at industrial sites where augmented reality is used to guide workers through complicated procedures (e.g., assembly of an engine), there is no longer a need to expend additional cost to produce 3-D data from 3-D data sources thanks to embodiments of the present invention. Rather, according to embodiments of the present invention, an augmented reality environment based on highly accurate 3-D coordinates is made possible with existing 2-D data.

Embodiments of the present invention, which involve estimating 3-D coordinates for displaying an augmented object on a smart glasses device that provides 3-D coordinates-based augmented reality by recognizing space through 2-D imagery, offers several advantages over prior solutions. Augmented reality software that utilizes traditional displays, such as those of smartphone and tablet, conventionally recognizes a real-world environment through 2-D images and, thus, displays any resulting augmented object with only 2-D coordinates. However, devices that use two or more holographic displays, such as smart glasses that can have a display for each eye of a user, a depth coordinate (z), in addition to 2-D coordinates (x,y), is desirable so that an augmented object can be displayed in 3-D space with 3-D coordinates and can have depth from the perspective of the user.

To accomplish this, embodiments of the present invention estimate 3-D coordinates based on 2-D image data, using back-projection. Such back-projection is based on an inverse of computer graphics (CG) processing methods in which projection is used to process 3-D data and project 3-D space onto a 2-D plane. In such CG processing methods, a projection of the 3-D space in which a virtual object is present is mapped onto a plane where a user's point of view is headed, thereby generating a 2-D image from the 3-D data. Embodiments of the present invention can perform this process in reverse, extrapolating 3-D coordinate data from 2-D images, also known as back-projection.

Embodiments of the present invention permit a smart glasses device to implement augmented reality using holographic technology to display a 3-D augmented object on a display of the smart glasses device, where this 3-D augmented object overlays and appears consistent with a real-world 3-D space/object. In addition, some embodiments of the present invention circumvent, and specifically do not use, 3-D modeling data of the real-world space/object of interest. Rather, embodiments utilize 2-D image recognition technology to recognize a real-world 3-D space/object of interest and find placement coordinates for augmented objects relative to that real-world 3-D, without the need for more costly, complicated 3-D data gathering devices.

Referring now to FIG. 1, a block diagram showing an internal configuration and process of a computer system 10 for implementing augmented reality according to illustrative embodiments of the present invention is shown. In some embodiments, computer system 10 can be a smart glasses device 20 and/or a component of smart glasses device 20. In some other embodiments, computer system 10 can be a computer system in communication (e.g., through a wired or wireless network) with a smart glasses device 20.

Although not shown, it should be understood that embodiments of the present invention can include computer system 10 for implementing and/or performing any of the functionality set forth here and below to implement augmented reality. Although traditional technical components are not shown, it should be understood that computer system 10 can include a processor; memory; a storage device; a bus connecting the processor, memory, and/or storage device; an input/output interface; as well as a network interface.

According to some embodiments, the processor can include a device to process a sequence of commands or be a part of such as device. The processor can take the form of a computer processor, a processor within a mobile device or other electrical device, and/or a digital processor. Computer system 10 for implementing augmented reality can include one or more processors, as system requirements may necessitate.

According to some embodiments, the memory can be configured to save information that is utilized by or generated from computer system 10 to implement augmented reality. The memory can include volatile, permanent, virtual, or the other types of memory. The memory can include, for example, random access memory (RAM) and/or dynamic RAM (DRAM). The memory can be used to store data, such as the status data of computer system 10. Also, the memory can be used in some embodiments to store commands to implement augmented reality functionality.

The bus can include communication infrastructure which allows various components of computer system 10 to interact. The bus can transport data between system components, such as between the processor and memory. The bus can include wired and/or wireless communication devices between components of computer system 10. The bus can also include parallel, series or another topology sequence.

The storage device, in comparison to the memory, can include long-term memory used in systems or components such as semi-permanent storage devices, for the storage of data for a fixed, extended time. The storage device can include a non-volatile main memory, similar to that which can be used by the processor of computer system 10. The storage device can also or alternatively include flash memory, hard disk, optical disk, and/or any other form of computer readable device.

The input/output interface can include, for example, a display, a keyboard, a mouse, a voice command input, and/or any other form of input/output interface. Configuration commands and/or any other input necessary to implement the functionality of the present invention can be transmitted through the input/output interface.

The network interface can include one or more interfaces for close-range network or networks like the Internet. The network interface can include interfaces for wired or wireless access. Configuration command and/or inputs necessary to implement the functionality of the present invention can be transmitted through the network interface.

Turning now to FIG. 1, components, input/output, and specific process to implement embodiments of the present invention are illustrated. Smart glasses device 20 and/or computer system 10 can include, for implementation of augmented reality according to embodiments of the present invention, 2-D camera 11, sensors 12, a memory or other (temporary) storage area for reference images 13 and real-time 2-D image data 14, matching component 25, recognition component 26, pose adjustment component 27, 3-D coordinates projection component 15, and AR display 16. In some embodiments, in cases where data used for implementing augmented reality is too large to be contained in a memory or storage of smart glasses device 20 and/or computer system 10, computer system 10 can be in communication with an external server 24 for storing data used in implementing augmented reality. In some embodiments, server 24 can be a cloud data server. In some embodiments, reference image 13 data and annotation data associated with 3-D coordinate projection component 15 can also be obtained from cloud server 24.

2-D camera 11 is used to collect optical data in the form of 2-D images of a real-world object 17 and/or a real-world space. More specifically, 2-D camera 11 collects real-time 2-D image data 14. 2-D camera 11 can be any type of image capturing device, such as a digital camera. In some embodiments, real-time 2-D image data 14 can be a live video feed of the real-world object 17 and/or real-world space.

Sensors 12 include a set of sensors, which can include one or more gyroscope sensors (gyro-sensor) and/or one or more acceleration sensors. Sensors 12 collect gyroscopic and acceleration data that can be used to estimate a location and a direction of a field of view of a viewing area of smart glasses device 20. In some embodiments, sensors 12 can also include one or more depth sensors. In these embodiments, a depth sensor of sensors 12 can collect a 2-D distance (i.e. depth) of smart glasses device 20 to real-world object 17. This distance data can take the form of an image, a ping measurement (e.g., laser, sound wave), etc., and can be used, as described below, to estimate a 3-D coordinates projection. In other words, sensors 12 can collect a location of, an angle of rotation of, and a distance/depth from object 17 to camera 11 and/or smart glasses device 20 or computer system 10 containing said camera 11.

Reference images 13 can include one or more previously obtained images of real-world object 17. In some embodiments, reference images 13 can include imagery from one or more technical manuals or other documentation depicting steps for performing a process (e.g., repairing an engine). According to some embodiments, because such reference images 13 (including not only reference images for a particular real-world object 17, but for many different potential real world objects) may be too large in size to fit in a memory/storage of smart glasses device 20, reference images 13 can be stored in server 24 located in the cloud. In some embodiments, cloud server 24 can also contain annotation/augmentation data for AR holographic objects 18 to be displayed in an augmented reality environment augmenting real-world object 17. As discussed below, matching component 25 can request reference images 13 from cloud sever 24 when matching component 25 performs the process of matching reference images with real-time 2-D image data 14. Furthermore, recognition component 26 can request annotation data from cloud server 24 once real-world object 17 is recognized for the coordinate projection by 3-D coordinate projection component 15.

Matching component 25 and recognition component 26 perform processes of an image recognition algorithm (e.g., object recognition). These processes include comparing reference images 13, on which matching component 25 and recognition component 26 have been pre-trained, from cloud server 24 with real-time 2-D image data 14 of real-world object 17. In some embodiments, the processes performed by matching component 25 and recognition component 26 are same as a general homography estimation algorithm of a computer vision field. Matching component 25 can perform the processes of feature extraction and feature matching, while recognition component 26 can perform the processes of consensus sampling and homography estimation.

Pose adjustment component 27 can, in some embodiments, perform a procedure to address recognition failure by recognition component 26. According to some embodiments, pose adjustment component 27 can actualize movement of camera 11 and/or prompt the user wearing smart glasses device 20 to move about, thereby adjusting the angle and/or location of 2-D camera 11 to permit another attempt at the object matching and recognition processes.

3-D coordinate projection component 15 can perform a process to combine the 2-D coordinates determined by recognition component 26, the location and angle of rotation of camera 11 and/or smart glasses device 20 collected by sensors 12, and the 2-D depth data collected by sensors 12 to calculate 3-D coordinates of an AR holographic object 18 to be displayed in an augmented reality environment augmenting real-world object 17.

AR display 16 is a holographic display that can display AR holographic object 18 to the eyes of a user. In some embodiments, AR display can be a hardware component of computer system 10 and/or smart glasses device 20. AR display 16 can use the 3-D coordinates generated by 3-D coordinates projection component 15 to position and output AR holographic object 18 in an augmented reality environment relative to real-world object 17. This permits AR holographic object 18 to appear consistent with real-world object 17 based on depth-perceptions, angle of observation, etc.

Computer system 10, according to embodiments of the present invention, can receive the following as inputs: a 2-D original image, previously stored in cloud server 24, of an object of interest; 2-D depth data information of a viewing space; a 2-D image of a current shot from 2-D camera 11; and location and rotation (i.e., direction of a field of view) information from the perspective of smart glasses device 20 worn by a user. Computer system 10 uses these inputs to produce holographic augmented object 18, which is displayed on smart glasses device 20 based on 3-D coordinates generated by computer system 10. The input data progressively passes through the components of computer system 10 described above, including 2-D image matching component 25 and recognition component 26, 3-D coordinates projection component 15, and AR display 16, and is transformed into placement and display specifications for holographic, augmented object 18. As such, as shown in FIG. 1, system 10 can receive optical data from real-world object 17 to implement augmented reality through 2-D camera data collected by smart glasses device 20.

Referring now to FIGS. 2-5, a process for implementing augmented reality based on a 2-D image will be shown and described. More specifically, referring now to FIG. 2 in connection to FIG. 1, an example of two-dimensional (2-D) image data, according to illustrative embodiments of the present invention is shown. A user can look through a smart glasses device 20 at real-world object 17 in a real-world environment 19. The user can move around real-world object 17 within real-world environment 19 and therefore does not always look at real-world object 17 straight on. That is to say, the user may look through smart glasses device 20 at real-world object 17 at, for example, an oblique angle. The appearance of real-world object 17 may, therefore, be affected by the position of the user and smart glasses device 20, with parts of real-world object 17 appearing proportionately larger or smaller due to a perspective of the user.

2-D camera 11, connected to computer system 10 and/or smart glasses device 20, captures 2-D image 21 (e.g., from a live video feed) from the perspective of the user wearing smart glasses device 20. By collecting visual data of real-world object 17 in 3-D real-world environment 19, 2-D camera 11 creates 2-D image(s) 21 containing 2-D visual image data 14.

At substantially the same time, sensors 12 can monitor and record angle/rotation, space/location, and depth data describing a position and "heading" or perspective direction of smart glasses device 20 and camera 11 connected to the smart glasses device 20. This can be accomplished through a gyro-sensor, acceleration sensor, and depth sensor included in sensors 12. Like camera 11, sensors 12 can be part of smart glasses device 20. It should be noted that this description will at times discuss a perspective of camera 11 and a perspective of smart glasses device 20. It should be understood that these are intended to convey the same and that any mention of a perspective, placement, etc. of camera 11 also indicates a perspective, placement, etc. of smart glasses device 20, and vice versa.

Computer system 10 can transform the angle/rotation and space/location data using a perspective transformation technique. Using the perspective transformation technique, computer system 10 can generate a 4×4 matrix called a projection matrix. This projection matrix transforms coordinate systems from the real-world environmental standard into a camera (smart glasses) spatial standard.

Figure 3:
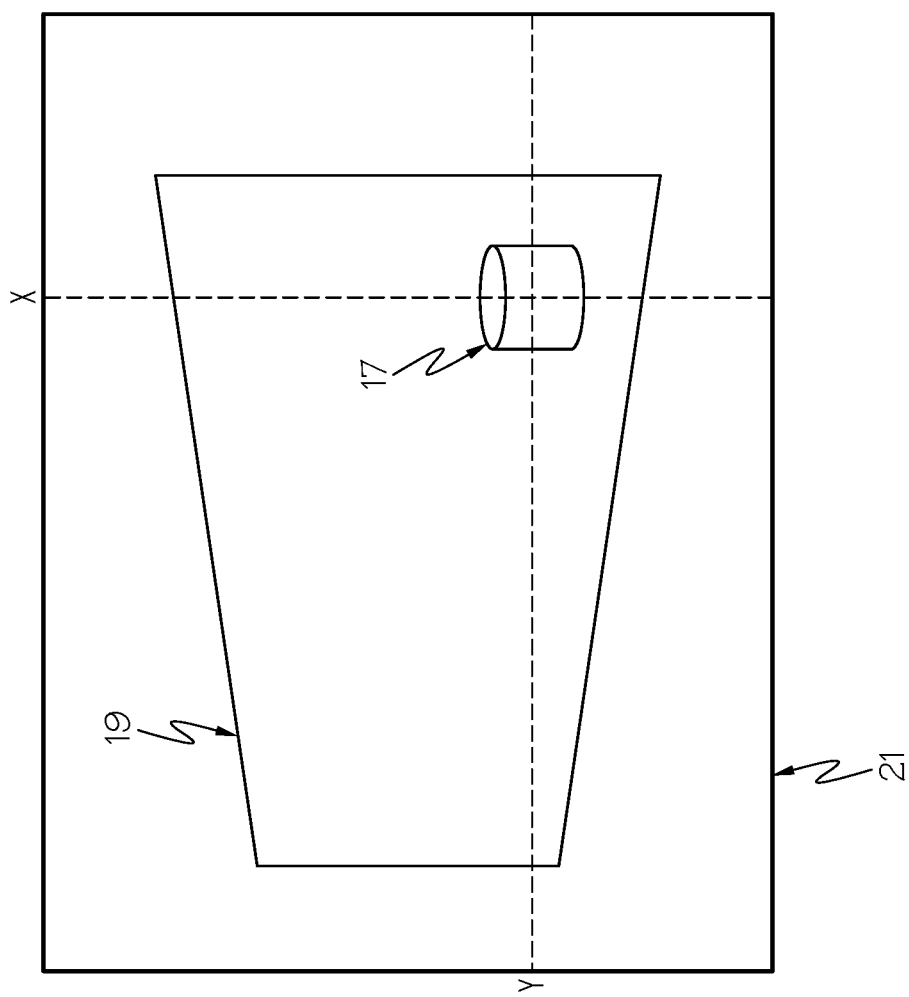
FIG. 3 shows a process by which 2-D image data is standardized as values of specific area, according to illustrative embodiments of the present invention.

Referring now to FIG. 3 in connection to FIG. 1, a process by which 2-D image data is standardized as values of specific area, according to illustrative embodiments of the present invention, is shown. As will be discussed in further detail below, recognition component 26 can generate 2-D coordinates (x,y) of the 2-D image 21 collected by camera 11. In some embodiments, recognition component 26 can utilize a 2-D image homography matrix estimation algorithm to generate this 2-D coordinate data (x,y). To accomplish this, in some embodiments, matching component 25 and recognition component 26 can perform the following processes. First, matching component 25 separately extracts feature points of reference from reference images 13 and 2-D image 21 of real-time 2-D image data 14. Matching component 25 can perform this task using an algorithm, such as: Scale-Invariant Feature Transform (SIFT), Speeded-Up Robust Features (SURF), Oriented FAST and Rotated BRIEF (ORB), Binary Robust Invariant Scalable Keypoints (BRISK), or any other feature point matching algorithm. Next, matching component 25 matches feature points between reference images 13 and 2-D image 21 of real-time 2-D image data 14 with descriptor values.

Figure 9:
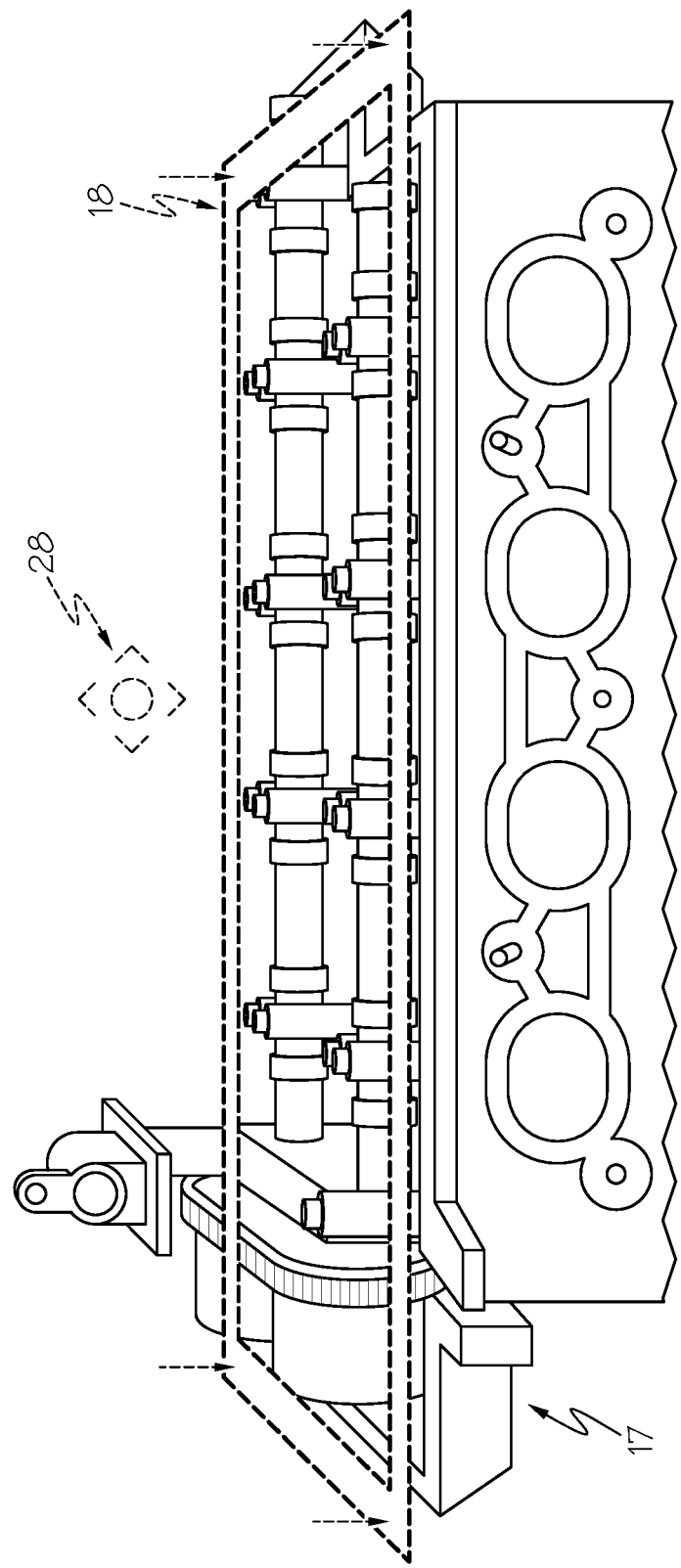
Figure 10:
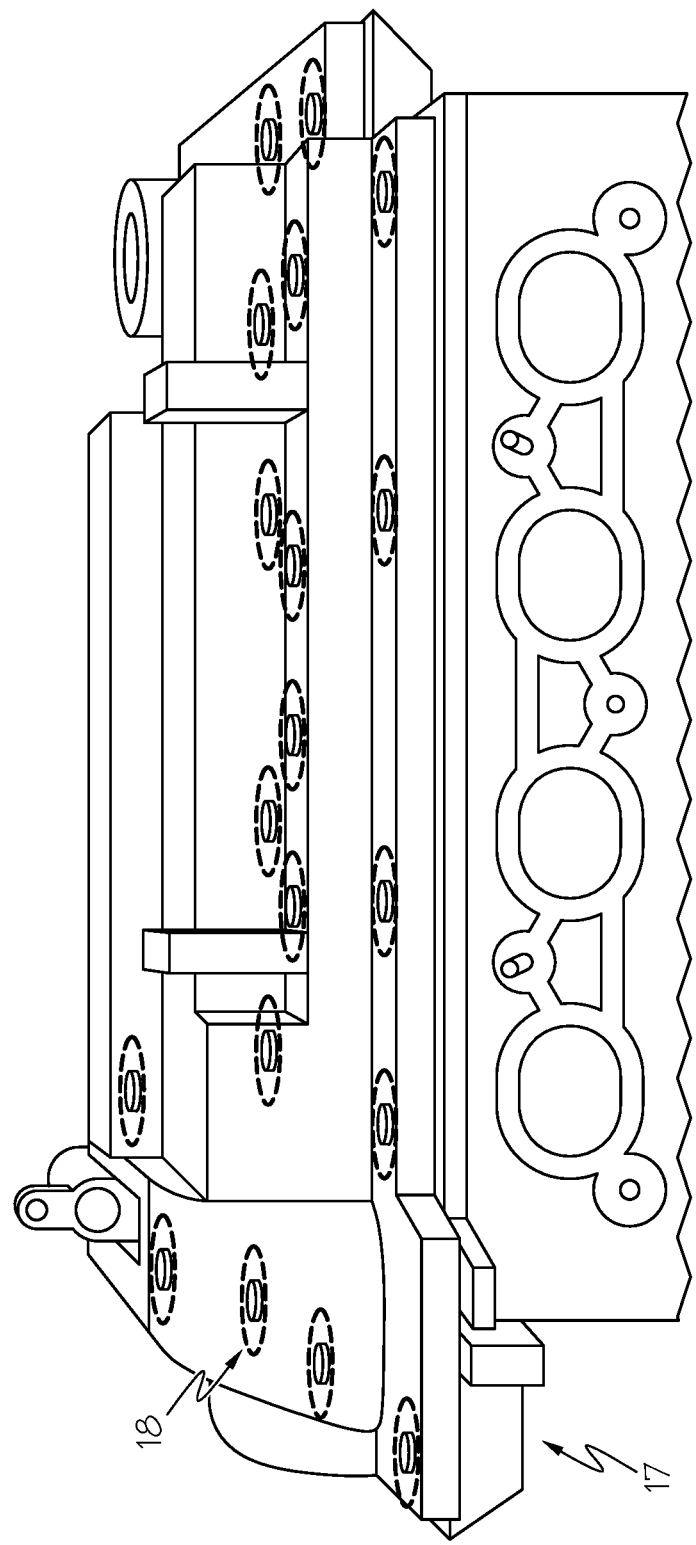

Then, recognition component 26 can remove errors, if applicable, and select 4 points pairs using a Random Sample Consensus (RANSAC) family. If recognition component 26 fails to select 4 points pairs, the recognition result fails. In this case, pose adjustment component 27 can actualize a movement of camera 11 and/or prompt the user wearing smart glasses device 20 to move (e.g., via AR movement indicator 28 in FIG. 9), thereby adjusting a pose of real-world object 17 in the view of camera 11 and allowing the matching and recognition process to be repeated with fresh real-time 2-D image data 14 showing object 17 from a different angle. Returning to the step at hand, however, if recognition component 26 successfully selects 4 points pairs, recognition component 26 then calculates the homography matrix from the 4 points pairs, and sends the pairs to 3-D coordinates projection component 15. The calculated homography matrix represents the relation of 2-D coordinates of real-world environment 19 to coordinates of 2-D camera image 21. By multiplying the homography matrix and the 2-D coordinates of real-world environment 19, the coordinates of camera image 21 are produced.

3-D coordinates projection component 15 can normalize the 2-D coordinate data (x,y), generated by recognition component 26, into camera space coordinates. Each axis of these camera space coordinates can range from −1 to 1, producing coordinates ranging from (−1,−1) to (1,1) for real-world object 17 appearing in image 21. This process permits the size (x,y) coordinates of 2-D image 21 to be represented as exact numbers between −1 and 1. However, because these normalized coordinates only correspond to x and y coordinates on a single plane, there is a need for a z-coordinate representing depth. At this stage, this z-coordinate can be temporarily represented an arbitrary value (e.g., 1).

Figure 4:
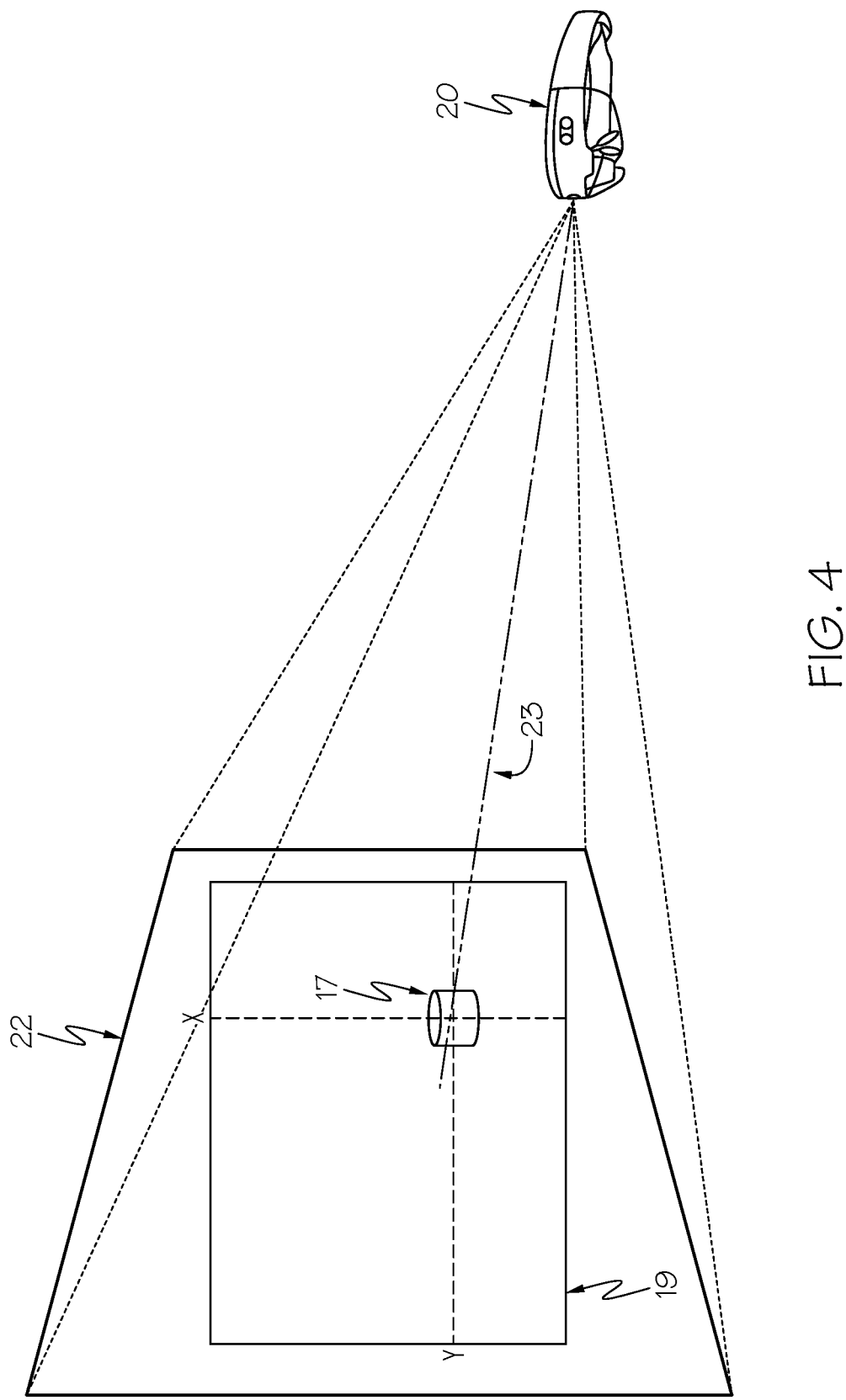
FIG. 4 shows a process by which a virtual 2-D plane is generated, according to illustrative embodiments of the present invention.

Referring now to FIG. 4 in connection to FIG. 1, a process by which a virtual 2-D plane 22 is generated, according to illustrative embodiments of the present invention, is shown. 3-D coordinates projection component 15 can generate/model a virtual plane 22 that is perpendicular to the user's point of view (i.e., line of sight) and located at the normalized coordinates previously generated by 3-D coordinates projection component 15. Generated plane 22 is a virtual plane used to back project from 2-D to 3-D, as described above, extrapolating 3-D coordinate data from the 2-D coordinates of real-world environment 19. As illustrated in FIG. 4, virtual 2-D plane 22 can be modeled in front of camera 11/smart glasses device 20 for back projection. The geometric location of virtual 2-D plane 22 can be determined by applying the projection matrix generated based on the transformed angle/rotation and space/location data to the normalized 2-D coordinates. In other words, 3-D coordinates projection component 15 utilizes the projection matrix to transform the normalized 2-D coordinates from a camera standard to a real-world standard. This permits 3-D coordinates projection component 15 to generate 3-D space coordinates on virtual plane 22 that are normalized coordinates on a plane, with a z coordinate value of 1.

3-D coordinates projection component 15 can further generate/model a virtual straight line 23 connecting real-world space coordinates of camera 11/smart glasses device 20 (based on the gathered angle/rotation and space/location data) to the generated 3-D space coordinates on virtual plane 22. By expanding straight line 23, 3-D coordinates projection component 15 can detect the original point of intersection with 2-D depth data from sensors 12. This detected point is identifies as the real-world 3-D coordinates at which to display AR holographic object 18.

Figure 5:
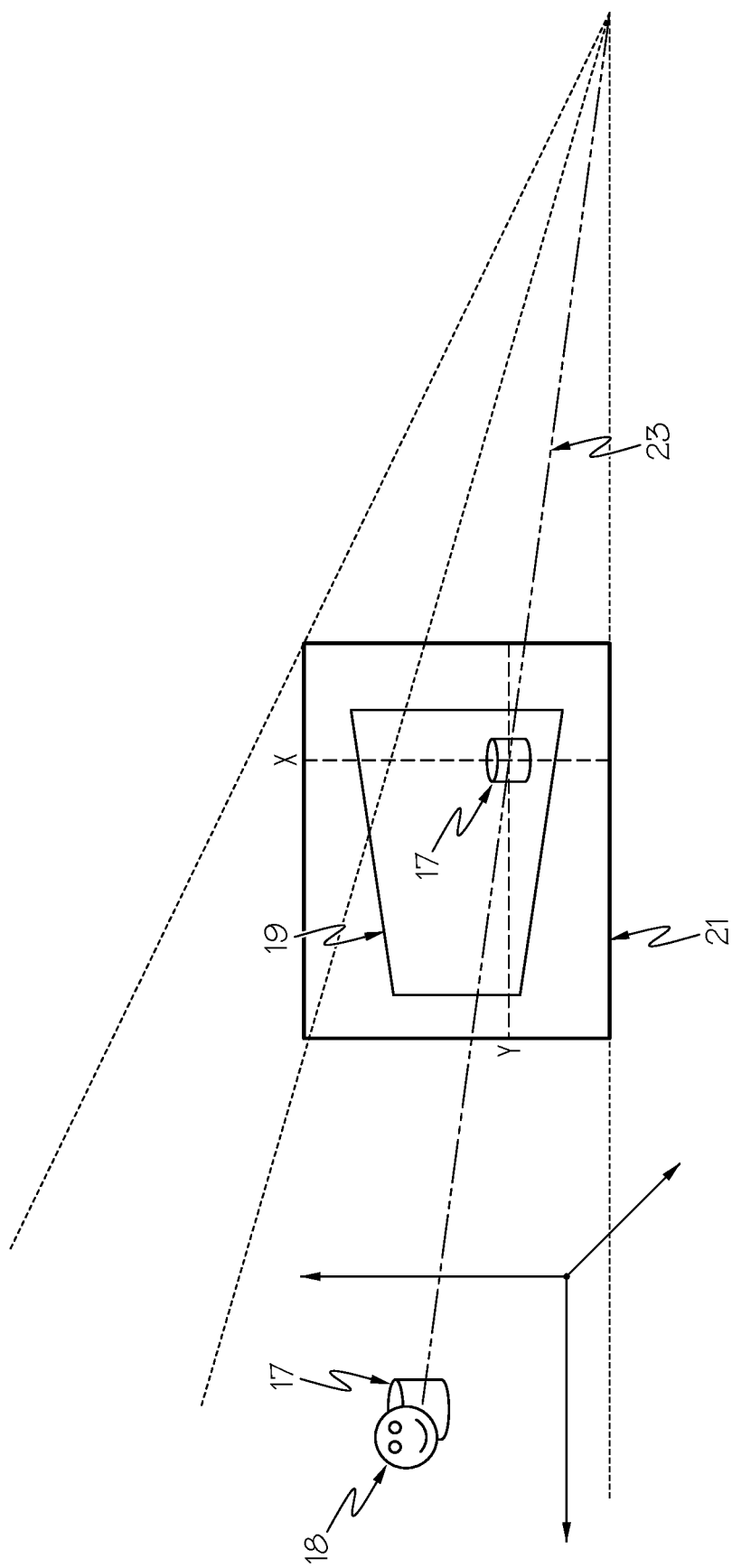
FIG. 5 shows a process by which a location to display an augmented object in three-dimensional (3-D) space is determined, according to illustrative embodiments of the present invention.

FIG. 5 shows a process by which a location to display augmented object 18 in three-dimensional (3-D) space is finally determined, according to illustrative embodiments of the present invention. As illustrated by FIG. 5, by expanding straight line 23 towards virtual 2-D plane 22 (not shown), a location for displaying augmented object 18 within actual 3-D space is found. Once this location is found, AR display 16 can display hologram 18 such that hologram 18 appears to be located at this location. In other words, AR display 16 appears to mark the location with hologram 18.

Figure 6:
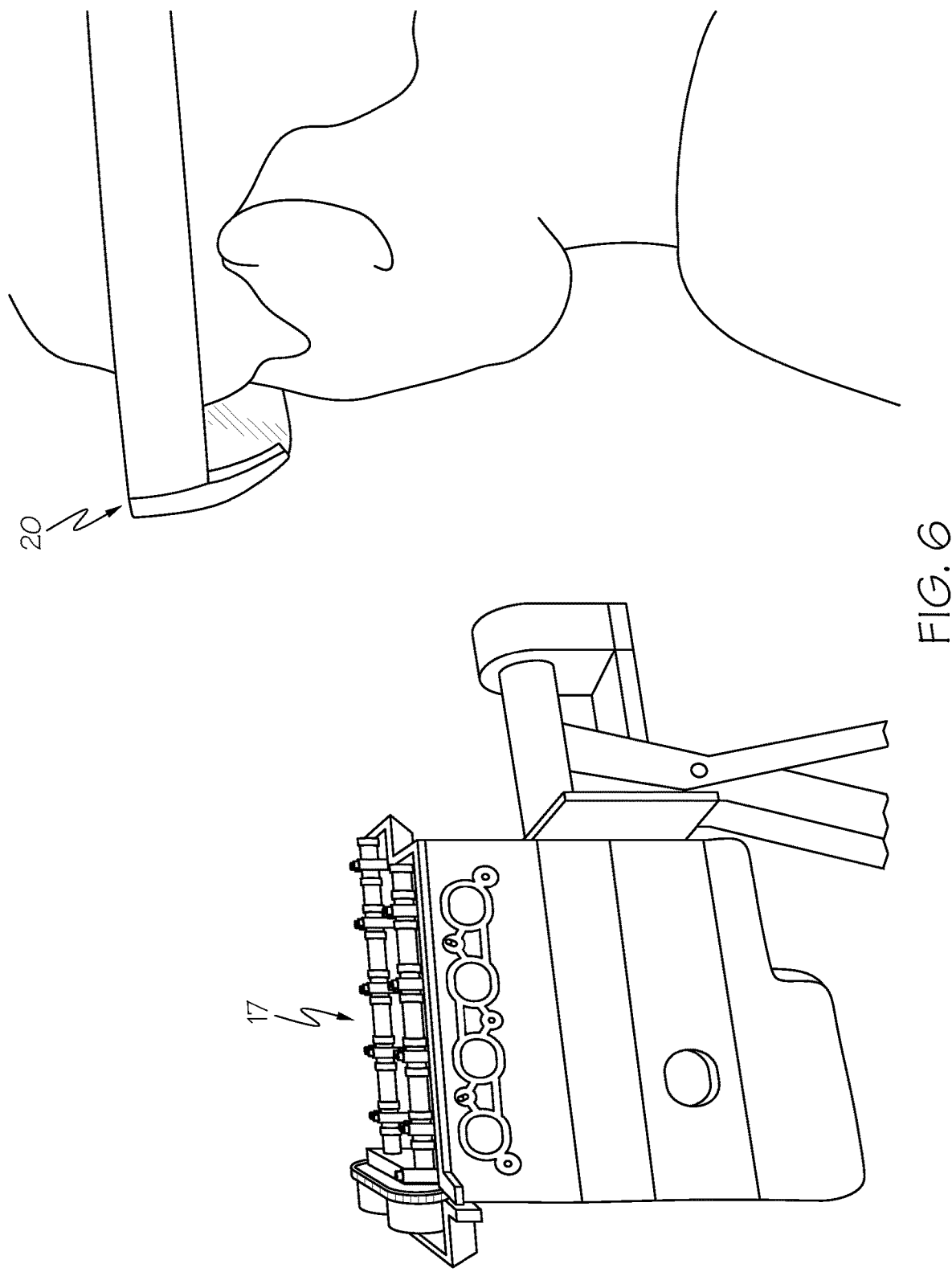
FIG. 6 shows an example implementation of augmented reality according to illustrative embodiments of the present invention, in which a user wears a pair of smart glasses while performing a task.
Figure 7:
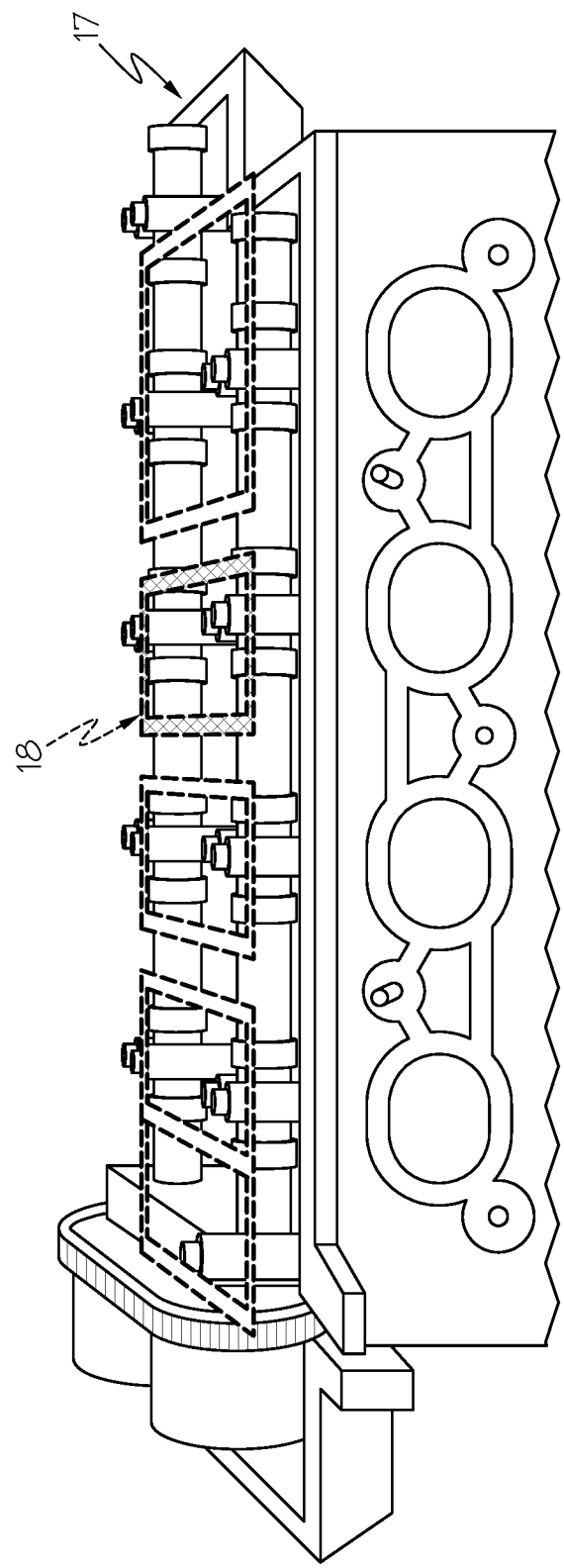
FIGS. 7 through 10 show an example in which augmented reality hologram objects are displayed over a real-world object in 3-D space via a pair of smart glasses according to illustrative embodiments of the present invention.
Figure 8:
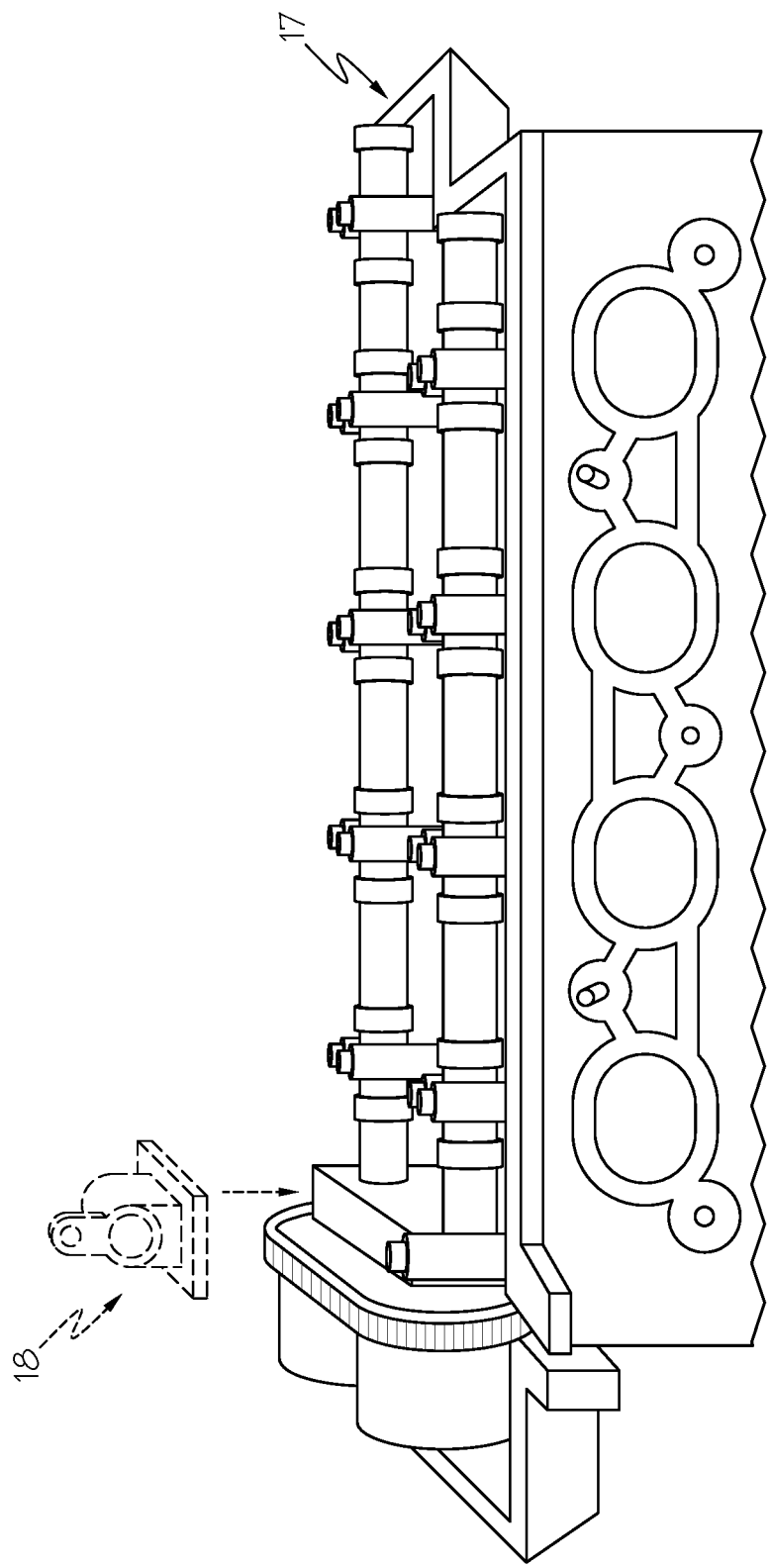

Referring now to FIGS. 6-10, a demonstration of an application of an embodiment of the preset invention is shown. FIG. 6 illustrates a user wearing a smart glasses device 20 configured with system 10, 2-D camera 11, sensors 12, matching component 25, recognition component 26, 3-D coordinates projection component 15, and AR display 16, as described herein. The user is looking at real-world object 17, an automobile engine in this example. By looking a real-world object 17 while wearing smart glasses device 20, camera and other sensor data about real-world object 17 and a surrounding environment can be collected.

FIGS. 7 through 10 show examples of augmented reality hologram objects 18 displayed at the location of real-world object 17 in 3-D space via a smart glasses device 20, as seen from the perspective (i.e., through the eyes) of the user. As seen in these figures, hologram objects 18 guide the user through a progressive procedure to maintain an automobile engine (object 17) through AR display 16. Based on data collected by smart glasses device 20, hologram augmented object 18 is positioned so as to appear consistent, particularly with respect to depth, with real-world object 17 (i.e., the automobile engine). For example, the holographic arrows and rectangle in FIG. 9 appear to narrow at a distance further from the user, giving the illusion of perspective on top of object 17. As illustrated in this example, by displaying a variety of hologram augmented objects 18 (e.g., shapes such as circles and quadrilaterals or text-based notations) that match a depth-perception of the user on top of actual object 17, a maintenance procedure can be guided.

As such, according to embodiments of the present invention, in the absence of 3-D model data of an object of interest, 3-D coordinates can be estimated for virtual objects augmenting the real-world object of interest by recognizing the location of the real-world object in space on the basis of a 2-D image. Through this process, at industrial sites for example, it is not necessary to generate high cost 3-D data. Rather, it is possible to utilize conventional 2-D data to implement highly accurate 3-D coordinate-based augmented reality.

The apparatus described above may be implemented as a hardware component, a software component, and/or a combination of hardware components and software components. For example, the apparatus and components described in the embodiments may be implemented within a computer system, such as, for example, a processor, a controller, an arithmetic logic unit (ALU), a digital signal processor, a microcomputer, a field programmable array (FPA), a programmable logic unit (PLU), a microprocessor, or any other device capable of executing and responding to instructions. The processing device may execute an operating system (OS) and one or more software applications that are executed on the operating system. The processing device may also access, store, manipulate, process, and generate data in response to execution of the software. For ease of understanding, the processing apparatus may be described as being used alone, but those skilled in the art will recognize that the processing apparatus may have a plurality of processing elements. For example, the processing apparatus may comprise a plurality of processors or one processor and one controller. Other processing configurations, such as a parallel processor, are also possible.

The software may comprise a computer program, code, instructions, or a combination of one or more of the foregoing, and may be configured to configure the processing apparatus to operate as desired or to command the processing apparatus independently or collectively. Software and/or data may be stored on any type of machine, component, physical device, virtual equipment, computer storage media, or device, such as a computer readable recording device. The software may be distributed over a networked computer system and stored or executed in a distributed manner. The software and data may be stored on one or more computer readable recording media.

The method according to an embodiment can be implemented in the form of a program command that can be executed through various computer means and recorded in a computer-readable medium. The computer-readable medium may include program instructions, data files, data structures, and the like, alone or in combination. The program instructions recorded on the medium may be those specially designed and constructed for the embodiments or may be available to those skilled in the computer software. Examples of computer-readable media include magnetic media such as hard disks, floppy disks and magnetic tape; optical media such as CD-ROMs and DVDs; magneto-optical media such as floppy disks; magneto-optical media, and hardware devices specifically configured to store and execute program instructions such as ROM, RAM, flash memory, and the like. Examples of program instructions include machine language code such as those generated by a compiler, as well as high-level language code that can be executed by a computer using an interpreter or the like.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

While the present invention has been described in connection with what is presently considered to be the most practical and preferred embodiments, it is to be understood that the invention is not limited to the disclosed embodiments, but, on the contrary, is intended to cover various modifications and similarities. For example, it should be understood that the techniques described may be performed in a different order than the described methods, and/or that components of the described systems, structures, devices, circuits, are replaced by an equivalent. It should be clearly understood that many variations and/or modifications of the basic inventive concepts herein taught, which may appear to those skilled in the pertinent art, will still fall within the spirit and scope of the present invention, as defined in the appended claims. Therefore, other implementations, other embodiments, and equivalents to the claims are within the scope of the following claims.

What is claimed is:

1. A method for implementing augmented reality in a smart glasses device, the method comprising:
   collecting two-dimensional (2-D) image data of a real-world object from a 2-D camera of the smart glasses device;
   generating 2-D coordinate data from the collected 2-D image data by:
   extracting feature points of reference from a set of reference images and the 2-D image data of the real-world object;
   matching feature points between the set of reference images and the 2-D image data of the real-world object with descriptor values;
   selecting a threshold plurality of points pairs; and
   calculating a matrix from the threshold plurality of points pairs;
   generating, based on location and rotation data of the smart glasses device and 2-D depth information from a viewing angle of the smart glasses device, three-dimensional (3-D) coordinates from the generated 2-D coordinate data;

generating, based on the 3-D coordinates generated from the 2-D coordinate data without three-dimensional (3-D) model data of the real-world object, a set of three-dimensional (3-D) augmented objects that narrow proportionate to a distance from the user, yielding an illusion of a consistent apparent depth with the real-world object, wherein the set of 3-D augmented objects further guide a user through a set of actions to perform a real-world task on specified elements of the real-world object; and displaying, on a holographic display of the smart glasses device, at least one augmented object of the set of augmented objects at an apparent location of at least one of the specified elements of the real-world object utilizing the 3-D coordinates.

2. The method of claim 1, the method further comprising using a 2-D image homography matrix estimation algorithm to generate the 2-D coordinate data.

3. The method of claim 1, the method further comprising:
calculating a projection matrix corresponding to an angle and distance of the smart glasses device to the real-world object;
standardizing the generated 2-D coordinate data as spatial coordinates of the 2-D camera;
creating, based on the standardized spatial coordinates, a virtual plane that is perpendicular to a line of sight of the smart glasses device;
generating the 3-D coordinates on the virtual plane using the calculated projection matrix; and
determining 3-D coordinates at which to display the augmented object based on the generated 3-D coordinates.

4. The method of claim 3, wherein the virtual plane is a back projection 2-D to 3-D space, wherein a geometric location of the virtual plane is determined based on the projection matrix and the standardized spatial coordinates.

5. The method of claim 3, the method further comprising:
generating a virtual straight line that connects location coordinates of the smart glasses device to the 3-D coordinates;
extending the virtual straight line to extract a point at which the straight line intersects with a 2-D depth image of the 2-D depth information to the real-world object; and
identifying the point as 3-D coordinates at which to display the augmented object.

6. The method of claim 1, wherein the augmented object at the apparent location of the real-world object appears to have essentially a same depth as the real-world object.

7. The method of claim 1, wherein the augmented object depicts a process step to be performed on the real-world object.

8. A computer system for implementing augmented reality in a smart glasses device, the computer system comprising:
the smart glasses device;
a memory medium comprising program instructions;
a bus coupled to the memory medium; and
a processor for executing the program instructions, coupled to the bus, that when executing the program instructions causes the system to:
collect two-dimensional (2-D) image data of a real-world object from a 2-D camera of the smart glasses device;
generate 2-D coordinate data from the collected 2-D image data by:
extracting feature points of reference from a set of reference images and the 2-D image data of the real-world object;
matching feature points between the set of reference images and the 2-D image data of the real-world object with descriptor values;
selecting a threshold plurality of points pairs; and
calculating a matrix from the threshold plurality of points pairs;
generate, based on location and rotation data of the smart glasses device and 2-D depth information from a viewing angle of the smart glasses device, three-dimensional (3-D) coordinates from the generated 2-D coordinate data;
generate, based on the 3-D coordinates generated from the 2-D coordinate data without three-dimensional (3-D) model data of the real-world object, a set of three-dimensional (3-D) augmented objects that narrow proportionate to a distance from the user, yielding an illusion of a consistent apparent depth with the real-world object, wherein the set of 3-D augmented objects further guide a user through a set of actions to perform a real-world task on specified elements of the real-world object; and
display, on a holographic display of the smart glasses device, at least one augmented object of the set of augmented objects at an apparent location of at least one of the specified elements of the real-world object utilizing the 3-D coordinates.

9. The computer system of claim 8, the instructions further causing the system to use a 2-D image homography matrix estimation algorithm to generate the 2-D coordinate data.

10. The computer system of claim 8, the instructions further causing the system to:
calculate a projection matrix corresponding to an angle and distance of the smart glasses device to the real-world object;
standardize the generated 2-D coordinate data as spatial coordinates of the 2-D camera;
create, based on the standardized spatial coordinates, a virtual plane that is perpendicular to a line of sight of the smart glasses device;
generate the 3-D coordinates on the virtual plane using the calculated projection matrix; and
determine 3-D coordinates at which to display the augmented object based on the generated 3-D coordinates.

11. The computer system of claim 10, wherein the virtual plane is a back projection 2-D to 3-D space, wherein a geometric location of the virtual plane is determined based on the projection matrix and the standardized spatial coordinates.

12. The computer system of claim 10, the instructions further causing the system to:
generate a virtual straight line that connects location coordinates of the smart glasses device to the 3-D coordinates;
extend the virtual straight line to extract a point at which the straight line intersects with a 2-D depth image of the 2-D depth information to the real-world object; and
identify the point as 3-D coordinates at which to display the augmented object.

13. The computer system of claim 8, wherein the augmented object at the apparent location of the real-world object appears to have essentially a same depth as the real-world object.

14. The computer system of claim 8, wherein the augmented object depicts a process step to be performed on the real-world object.

15. A computer program product for implementing augmented reality in a smart glasses device, the computer program product comprising a computer readable hardware storage device, and program instructions stored on the computer readable hardware storage device, to:
collect two-dimensional (2-D) image data of a real-world object from a 2-D camera of the smart glasses device;
generate 2-D coordinate data from the collected 2-D image data by:
extracting feature points of reference from a set of reference images and the 2-D image data of the real-world object;
matching feature points between the set of reference images and the 2-D image data of the real-world object with descriptor values;
selecting a threshold plurality of points pairs; and
calculating a matrix from the threshold plurality of points pairs;
generate, based on location and rotation data of the smart glasses device and 2-D depth information from a viewing angle of the smart glasses device, three-dimensional (3-D) coordinates from the generated 2-D coordinate data;
generate, based on the 3-D coordinates generated from the 2-D coordinate data without three-dimensional (3-D) model data of the real-world object, a set of three-dimensional (3-D) augmented objects that narrow proportionate to a distance from the user, yielding an illusion of a consistent apparent depth with the real-world object, wherein the set of 3-D augmented objects further guide a user through a set of actions to perform a real-world task on specified elements of the real-world object; and
display, on a holographic display of the smart glasses device, at least one augmented object of the set of augmented objects at an apparent location of at least one of the specified elements of the real-world object utilizing the 3-D coordinates.

16. The computer program product of claim 15, the computer readable storage device further comprising instructions to use a 2-D image homography matrix estimation algorithm to generate the 2-D coordinate data.

17. The computer program product of claim 15, the computer readable storage device further comprising instructions to:
calculate a projection matrix corresponding to an angle and distance of the smart glasses device to the real-world object;
standardize the generated 2-D coordinate data as spatial coordinates of the 2-D camera;
create, based on the standardized spatial coordinates, a virtual plane that is perpendicular to a line of sight of the smart glasses device;
generate the 3-D coordinates on the virtual plane using the calculated projection matrix; and
determine 3-D coordinates at which to display the augmented object based on the generated 3-D coordinates.

18. The computer program product of claim 17, wherein the virtual plane is a back projection 2-D to 3-D space, wherein a geometric location of the virtual plane is determined based on the projection matrix and the standardized spatial coordinates.

19. The computer program product of claim 17, the computer readable storage device further comprising instructions to:
generate a virtual straight line that connects location coordinates of the smart glasses device to the 3-D coordinates;
extend the virtual straight line to extract a point at which the straight line intersects with a 2-D depth image of the 2-D depth information to the real-world object; and
identify the point as 3-D coordinates at which to display the augmented object.

20. The computer program product of claim 15, wherein the augmented object at the apparent location of the real-world object appears to have essentially a same depth as the real-world object.

* * * * *